United States Patent
Stevens et al.

(10) Patent No.: US 7,622,701 B2
(45) Date of Patent: Nov. 24, 2009

(54) TOOLESSLY ADJUSTABLE CUPOLA AND PHOTOCONTROL RECEPTACLE ASSEMBLY

(75) Inventors: John D. Stevens, Covington, GA (US); Mark Anthony Hand, Covington, GA (US); Shawn Wilcox, Simpsonville, SC (US)

(73) Assignee: ABL IP Holding LLC, Conyers, GA (US)

( * ) Notice: Subject to any disclaimer, the term of this patent is extended or adjusted under 35 U.S.C. 154(b) by 475 days.

(21) Appl. No.: 11/520,973

(22) Filed: Sep. 14, 2006

(65) Prior Publication Data

US 2008/0067322 A1 Mar. 20, 2008

(51) Int. Cl.
*G01C 21/02* (2006.01)
*F21V 3/00* (2006.01)
*H01R 13/64* (2006.01)

(52) U.S. Cl. .............................. 250/214 AL; 250/239; 439/377; 362/642

(58) Field of Classification Search ............. 250/206.1, 250/214 AL, 239; 362/642; 439/559, 377, 439/677
See application file for complete search history.

(56) References Cited

U.S. PATENT DOCUMENTS 4,477,143 A 10/1984 Taylor
4,520,435 A * 5/1985 Baldwin ..................... 362/311

* cited by examiner

*Primary Examiner*—John R Lee
(74) *Attorney, Agent, or Firm*—Kilpatrick Stockton, LLP

(57) ABSTRACT

Certain embodiments of the present invention provide a cupola and photocontrol receptacle assembly that allows a user to adjust the direction of the cupola base and the photocontrol receptacle simultaneously without using tools. A fixture housing may have an opening for receiving a photocontrol receptacle connection member and one or more ribs located in proximity to the fixture housing opening. A cupola base may include an opening for receiving the connection member and features adapted to detachably engaged the fixture housing ribs. In addition, a spring may be coupled to the connection member and configured to allow the photocontrol receptacle to move in a first direction upon the application of a force in the first direction and recoil when the force is removed or decreased.

22 Claims, 7 Drawing Sheets

TOOLESSLY ADJUSTABLE CUPOLA AND PHOTOCONTROL RECEPTACLE ASSEMBLY

FIELD OF THE INVENTION

The present invention relates generally to a cupola and photocontrol receptacle assembly that allows a user to adjust the cupola and photocontrol receptacle without the use of tools.

BACKGROUND OF THE INVENTION

A decorative covering, or cupola, may be used to house a photocontrol receptacle and/or photocontrol and attached to an outdoor light fixture. Generally, a photocontrol is a sensor that monitors the amount of light available from light sources, for example the sun, other than the attached light fixture and controls the operation of the light source contained in the light fixture. For example, a photocontrol sensor may automatically turn the attached lights on at dusk and off at dawn.

Conventional cupola assemblies include a housing attached to the light fixture with a cupola base secured, such as by using screws, to the housing. The photocontrol is contained in a cupola base and connected to a photocontrol receptacle. The photocontrol receptacle is connected to the cupola base or the light fixture, such as by screws, and contains wiring or other structure that connects the photocontrol to an electric power source and/or the light fixture to allow the photocontrol to control the light source contained inside the light fixture. The cupola base includes a window or other opening to allow the photocontrol to monitor the amount of light outside of the cupola. A removable cupola cover is connected to the top of the cupola base as a decorative feature or to protect the photocontrol sensor or the light fixture from the environment.

The orientation of the photocontrol receptacle often needs adjusting to align the photocontrol sensor with the cupola base window. To adjust the photocontrol receptacle in conventional cupolas, a user must remove the cupola cover, use a screwdriver or other tool to disconnect the photocontrol receptacle from the cupola base on the light fixture, rotate the photocontrol receptacle to the desired position, reattach the photocontrol receptacle using a screwdriver or other tool, and reattach the cupola cover. This process can be time consuming and frustrating to a user.

In addition, the orientation of the cupola base window and photocontrol sensor often requires adjustment. For instance, the cupola base window may need to be adjusted away from the direction of the rising or setting sun to obtain a desirable control of the light source contained in the light fixture. Similarly, the cupola base window may need to be adjusted to point the window, and likewise the photocontrol sensor, away from other light sources that may affect the performance of the photocontrol sensor in controlling the light source contained in the light fixture. To adjust the cupola base window orientation, a user must typically remove the cupola cover, remove the photocontrol receptacle by using a screwdriver or other tool, detach the cupola base from the fixture housing by using a screwdriver or other tool, rotate the cupola base such that the cupola base window is oriented in the desired direction, reattach the cupola base to the fixture housing, reattach the photocontrol receptacle, and reattach the cupola cover. This process can also be time consuming and frustrating, especially if the user must repeat this procedure due to the changing lighting conditions around the cupola and/or a desire for changing the amount of light receivable by the photocontrol.

Therefore, a need exists for a cupola assembly that does not require the user to adjust the orientation of the photocontrol with respect to the cupola base window and prevents the photocontrol from becoming misaligned with the cupola base window. A need also exists for a cupola assembly that allows a user to adjust the orientation of the photocontrol sensor and, correspondingly, the orientation of the cupola base window without using tools.

SUMMARY OF THE INVENTION

Accordingly, certain exemplary embodiments of the present invention provide a cupola and photocontrol receptacle assembly that allows a user to adjust the direction of the cupola base and the photocontrol receptacle simultaneously without using tools. Certain aspects and embodiments of the present invention provide a fixture housing with an opening for receiving a photocontrol receptacle connection member and one or more ribs located in proximity to the fixture housing opening. A cupola base may include an opening for receiving the connection member and features adapted to detachably engage the fixture housing ribs. A spring may be coupled to the connection member and configured to allow the photocontrol receptacle to move in a first direction upon the application of a force in the first direction and recoil when the force is removed or decreased.

To adjust the direction of the cupola base and the photocontrol receptacle of some embodiments of the present invention, a user lifts the cupola base relative to the fixture housing. The spring may be adapted to allow a relatively small amount of movement in one direction, such as vertically. When the user lifts the cupola base, the cupola base may become disengaged with the fixture housing. The photocontrol receptacle and, if installed, the photocontrol can be rotated simultaneously with the cupola base, thereby maintaining an alignment of the photocontrol and the cupola base window. When the user lowers or releases the cupola base, the spring recoils and can pull the cupola base in the opposite direction from which it was lifted. The cupola base can then re-engage the fixture housing, thereby restricting the cupola base from rotating relative to the fixture housing.

Some embodiments of the present invention provide an apparatus comprising a photocontrol receptacle comprising a base portion and a connection member. The apparatus may further comprise a fixture housing comprising an opening for receiving the connection member and at least one rib and a cupola base comprising an opening for receiving the connection member and at least one feature for detachably engaging the at least one fixture housing rib. The apparatus may also include a spring coupled to the connection member, the spring configured such that the photocontrol receptacle moves in a first direction upon the application of a force in the first direction and recoils when the force is removed or decreased. The at least one feature of the cupola base is configured to disengage with the at least one rib of the fixture housing when the photocontrol receptacle is moved in the first direction.

Some embodiments of the present invention provide a photocontrol receptacle comprising a base portion and a connection member, a fixture housing comprising an opening for receiving the connection member and at least one rib, a cupola base comprising an opening for receiving the connection member and at least one feature configured to detachably engage the at least one rib, and a spring. The connection member is inserted in the cupola base opening and in the fixture housing opening. The spring is coupled to the connection member and configured such that the photocontrol receptacle moves in a first direction upon the application of a force in the first direction and recoils when the force is removed or decreased. The cupola base features may disengage with the at least one rib of the fixture housing when the photocontrol receptacle is moved in the first direction.

Other embodiments may comprise a photocontrol receptacle comprising a base portion and a connection member extending from the base portion, the connection member comprising a primary flange and a locator flange, the primary flange having a different size than the locator flange. The cupola base may have a window for allowing light to enter the cupola base and an opening with a primary notch and a locator notch having a different size than the primary notch. The primary notch is configured to receive the primary flange and the locator notch is configured to receive the locator flange of the connection member. The primary notch and locator notch may be positioned to orient the photocontrol receptacle to a pre-set location relative to the cupola base window.

In another embodiment, an apparatus comprises a fixture housing comprising a primary rib and a stop rib. The apparatus may also comprise a cupola base comprising a primary feature and a stop feature, the primary and stop features adapted to detachably engage the ribs. In one embodiment, the stop rib is adapted to engage the stop feature to limit rotation of the cupola base to less than 360°.

BRIEF DESCRIPTION OF THE DRAWINGS

FIG. 3b shows an expanded view of the cupola base features shown in FIG. 3a.

FIG. 4b shows an expanded view of the fixture housing ribs shown in FIG. 4a.

FIG. 6b is an expanded view of the photocontrol receptacle connection member shown in FIG. 6a.

FIG. 7b is an expanded view of the cupola base opening shown in FIG. 7a.

FIG. 8b shows the photocontrol receptacle engaging the cupola base shown in FIG. 8a.

DETAILED DESCRIPTION OF THE INVENTION

Figure 1:
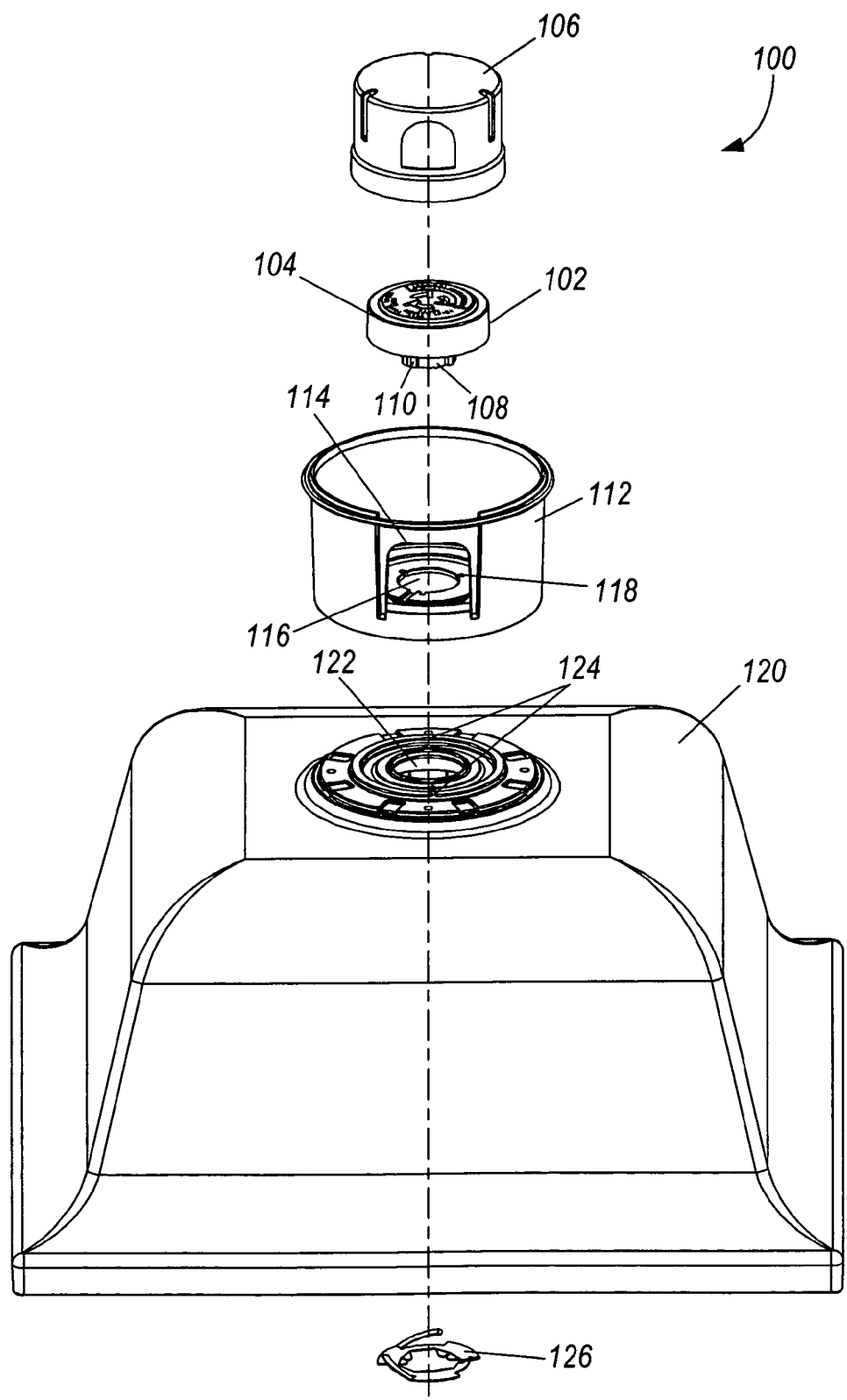
FIG. 1 shows a cupola and photocontrol receptacle prior to assembly according to one embodiment of the present invention.

FIG. 1 shows one embodiment of an unassembled cupola and photocontrol unit 100. The unit 100 includes a photocontrol receptacle 102 with a base portion 104 that is generally circular and configured to connect with a photocontrol 106. The photocontrol receptacle 102 also includes a connection member 108 extending from the base portion 104. The connection member 108 includes flanges 110 extending outwardly relative to the connection member 108 for engaging a cupola base 112.

The cupola base 112 includes a window 114 to allow the photocontrol 106 to monitor the presence of light outside of the cupola base 112 and an opening 116 in the bottom of the cupola base 112. The cupola base 112 also includes one or more features (not shown) located on the bottom surface. The cupola base opening 116 is configured to receive the connection member 108 and includes notches 118 configured to receive the connection member flanges 110. When the connection member flanges 110 are received by the notches 118, the rotational movement of the photocontrol receptacle is restricted. As described in more detail below, some embodiments provide a cupola base opening 116 with notches 118 of different sizes and a connection member 108 with flanges 110 of different sizes such that the photocontrol receptacle 102 is received in the cupola base opening 116 in one orientation to ensure alignment between the cupola base window 114 and the photocontrol sensor.

Figure 2:
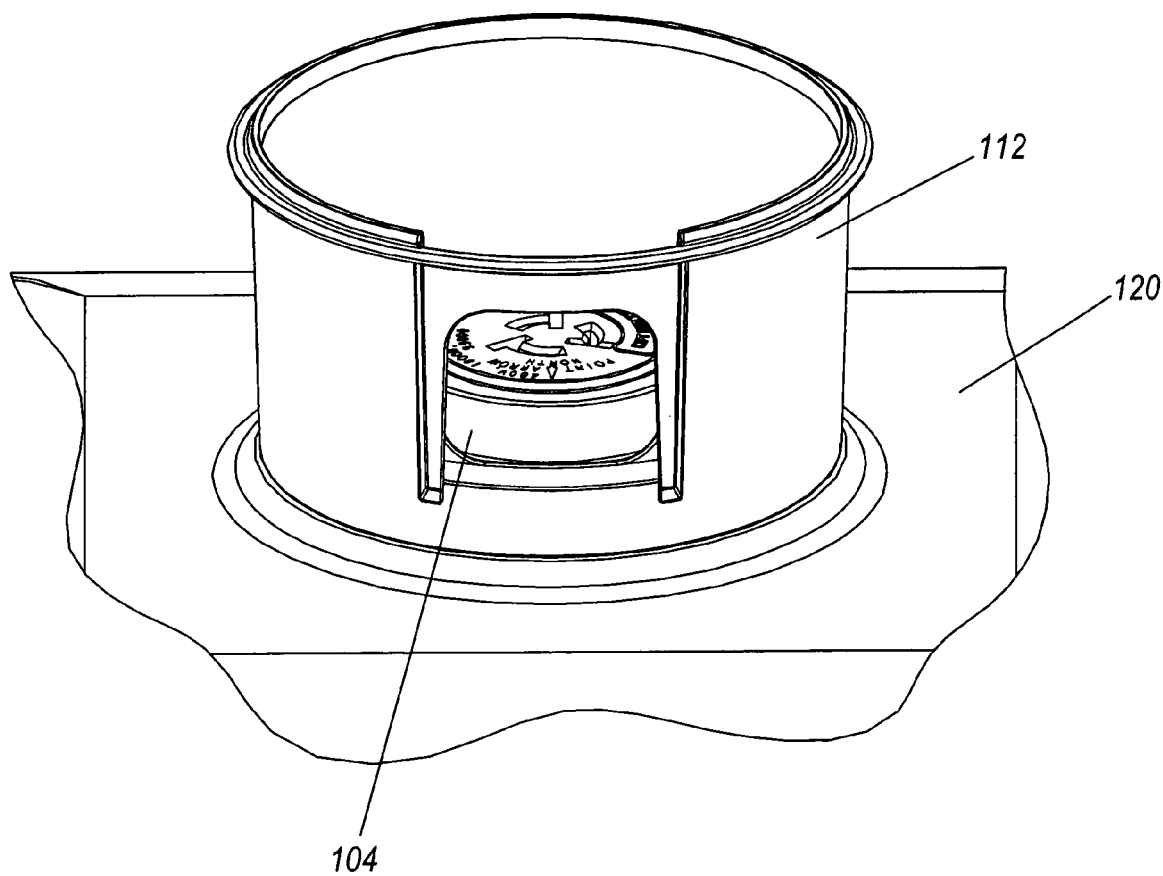
FIG. 2 is a perspective view of an assembled cupola base according to one embodiment of the present invention.

The unit 100 also includes a fixture housing 120 adapted to be connected to a light fixture (not shown). The fixture housing 120 includes an opening 122 on the top of the fixture housing for receiving the connection member 108 and a plurality of ribs 124 surrounding the opening 122. The ribs 124 detachably engage the cupola base features to restrict rotational movement by the cupola base 112 relative to the housing 120. For instance, the cupola base features can receive the fixture housing ribs 124 and prevent movement except in the upward direction. As shown in FIG. 2, the cupola base 112 rests on top of the housing 120. The ribs 124 may be any type of structure. Examples of ribs 124 include ribs, slots, protrusions, flanges, extensions, bumps, holes, knobs, hooks, and dimples.

When the unit 100 is assembled, the connection member 108 may extend into the fixture housing 120 and may be attached to a spring 126. The spring 126 may be disk shaped and adapted to exert a downward force on the connection member 108 and thus the photocontrol receptacle 102. The base portion 104 exerts the downward force on the cupola base 112, thereby assisting in the engagement between the cupola base features and the fixture housing ribs 124. The spring 126 may be adapted to allow the cupola base 112 and photocontrol receptacle 102 to be lifted vertically upward a limited distance by a user. When the user lifts the cupola base 112, the photocontrol receptacle 102 is also lifted. After the user lifts the cupola base 112, the user may rotate the cupola base 112 such that the cupola base window 114 and, since the photocontrol receptacle 102 rotates with the cupola base 112, the photocontrol sensor are in a desired position.

The photocontrol receptacle 102, cupola base 112, and fixture housing 120 may be made from any suitable material. Examples of such material include polymers or metal molded, cast, or otherwise configured to selected shapes and specifications. The spring 126 may be made from metal or other material capable of having a resilient configuration and, in some embodiments, provide a recoil.

Figure 3A:
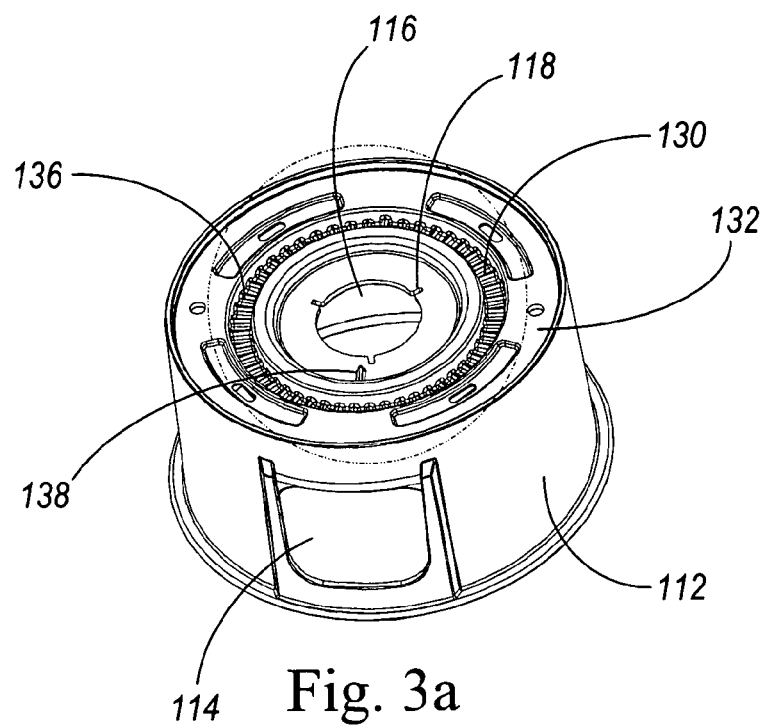
FIG. 3a is a bottom view of a cupola base according to one embodiment of the present invention.
Figure 3B:
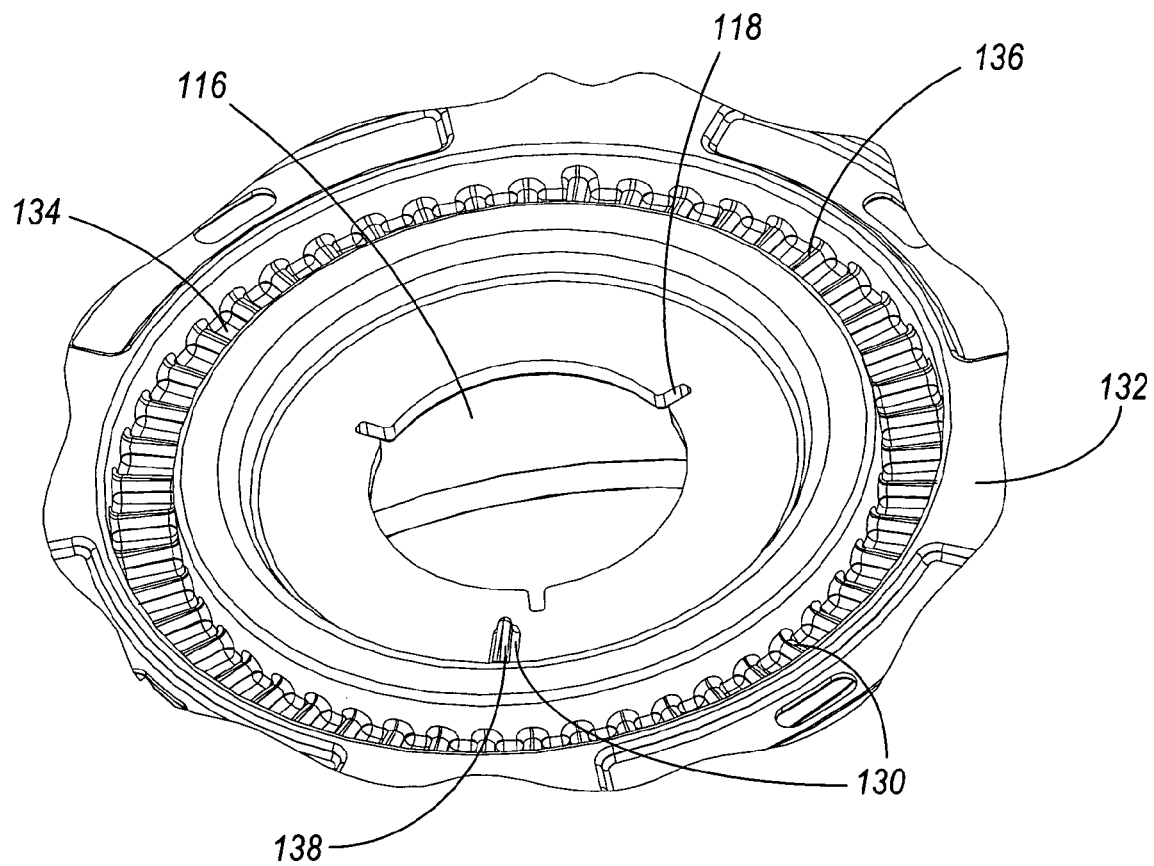

FIGS. 3a and 3b illustrate one embodiment of the cupola base features 130 that may be used on a cupola base, such as cupola base 112. The features 130 may be located on the bottom surface 132 of the cupola base 112. The features 130 may be formed by extending areas of the cupola base outwardly relative to the cupola base bottom surface 132, thereby creating features 130 and depressed areas or grooves 134 between the features 130 or by creating grooves 134 in the bottom surface 132, thereby creating the features 130. The features 130 may include primary features 136 around an outer portion of the bottom surface 132 and at least one stop feature 138 closer to the center opening 116. In some cupolas, the wiring connecting the photocontrol to the light fixture and/or electric power source may be tangled if the cupola base 112 was allowed to rotate 360° or more. The stop feature 138 engages a stop rib (described below) associated with the fixture housing to prevent the cupola base 112 from rotating 360° or more. The features 130 may be any type of structure. Examples of features 130 include ribs, slots, protrusions, flanges, extensions, bumps, holes, knobs, hooks, and dimples.

Figure 4A:
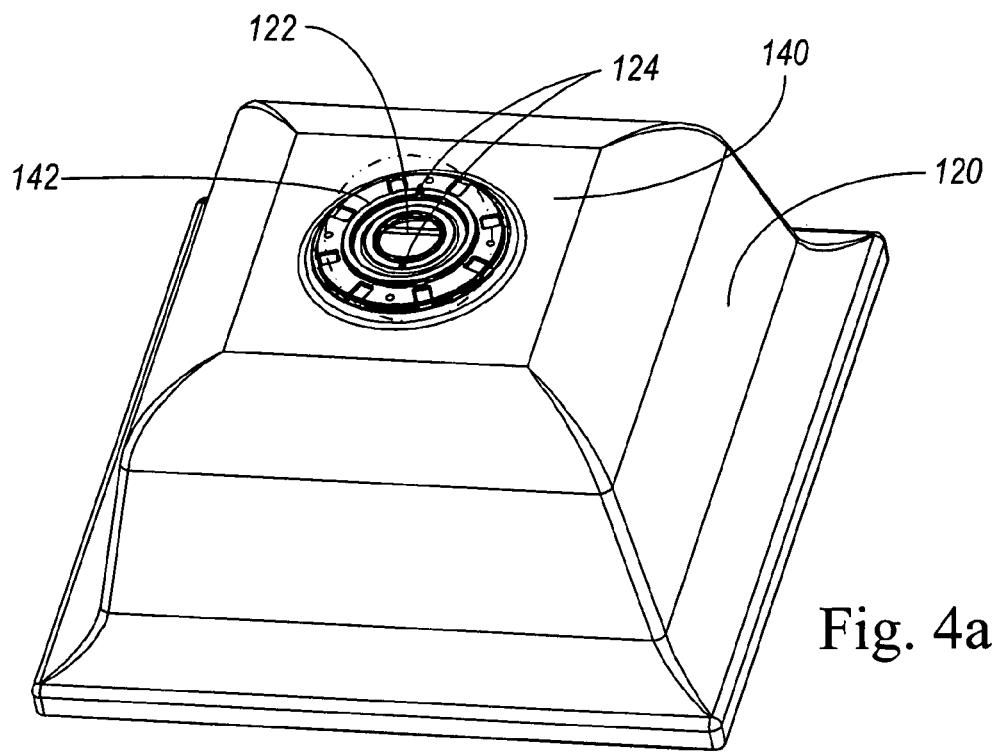
FIG. 4a is a perspective view of a fixture housing according to one embodiment of the present invention.
Figure 4B:
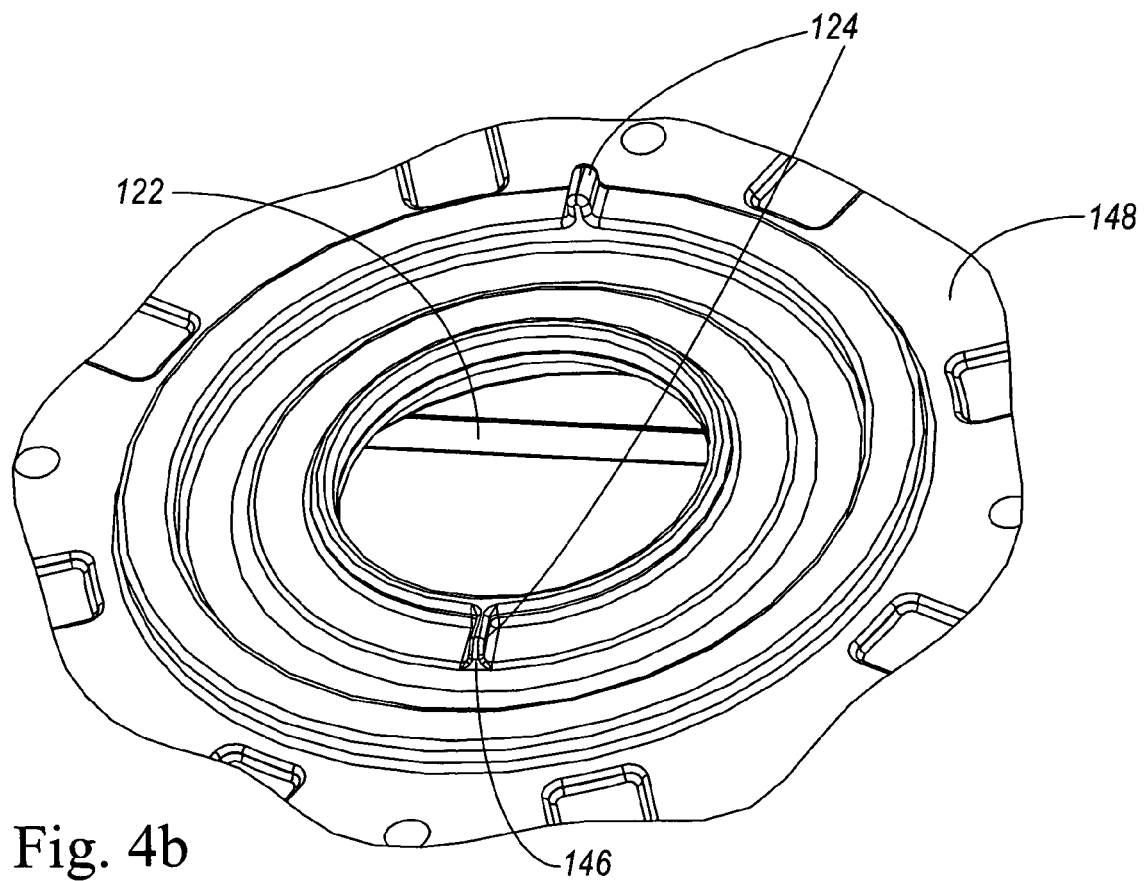
Figure 5A:
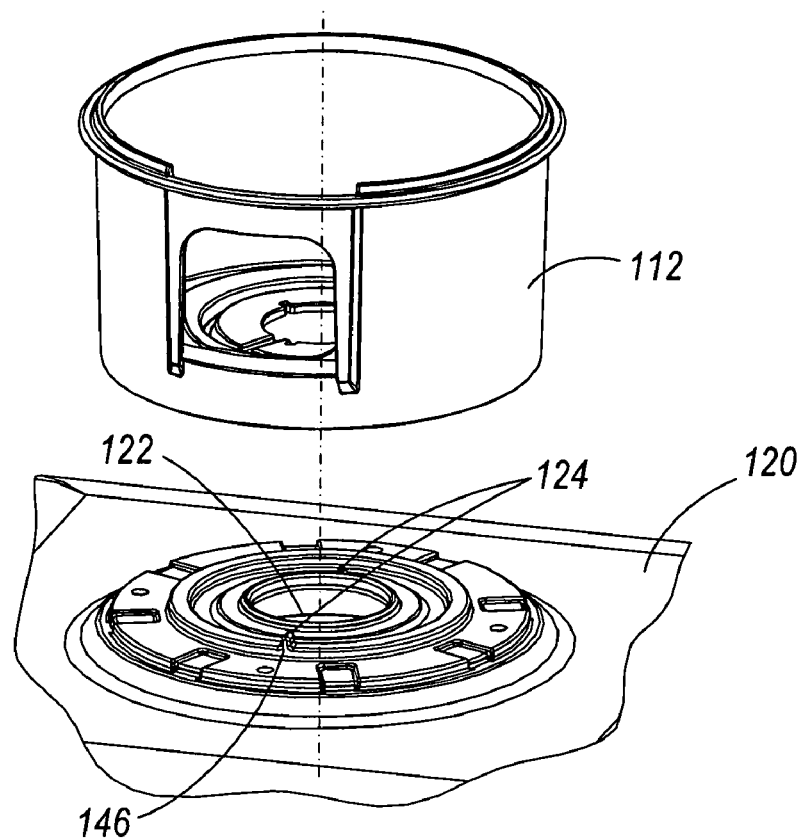
FIG. 5a shows a cupola base prior to engagement with a fixture housing according to one embodiment of the present invention.
Figure 5B:
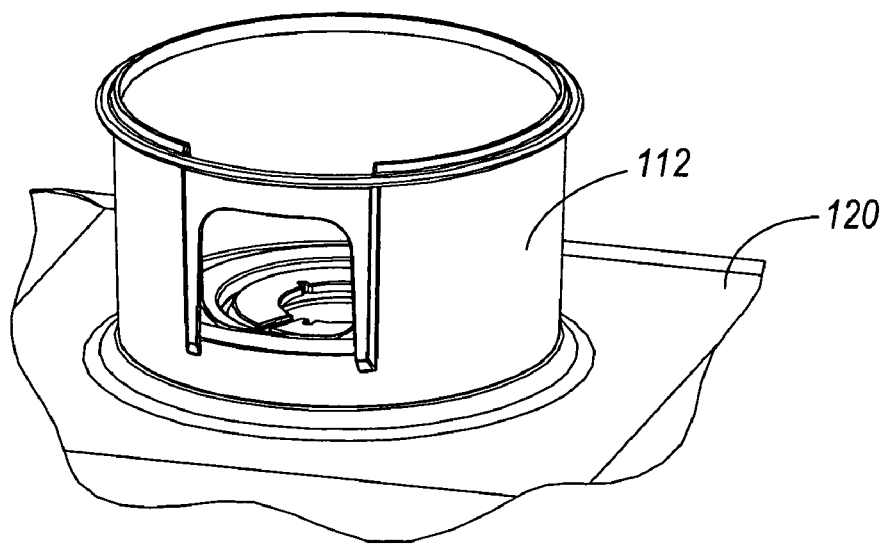
FIG. 5b shows the cupola base shown in FIG. 5a engaging the fixture housing.

FIGS. 4a and 4b illustrate one embodiment of the fixture housing ribs 124 that may be used in a housing such as fixture housing 120. The ribs 124 may be located on the top surface 140 of the fixture housing 120 and surround the fixture housing opening 122. The ribs 124 may be formed using similar methods as those used to form the cupola base features. For instance, areas of the fixture housing outer surface 148 may be extended inwardly relative to the fixture housing top surface 140, thereby creating ribs 124 and lowered areas 142 between the ribs 124 or portions of the top surface 140 may be added, thereby creating ribs 124 and areas 142 between the ribs 124. When the ribs 124 engage or connect with the features 130, as shown in FIGS. 5a and 5b, the cupola base 112 is prevented from rotating relative to the fixture housing 120. The ribs 124 may include at least one stop rib 146. The stop rib 146 is located and shaped to engage the stop feature 138 of the cupola base 112 to prevent the cupola base from rotating 360° or more.

In some embodiments of the present invention, the cupola base does not include features or only includes a stop feature and the fixture housing does not include ribs or only includes a stop rib. In these embodiments, the cupola base may be rotated with or without lifting the cupola base and, due to the engagement of the photocontrol receptacle and the cupola base described in more detail below, the photocontrol receptacle, and thus the photocontrol sensor, does not rotate relative to the cupola base. Furthermore, embodiments of the present invention may include any desired number of ribs and features.

Figure 6A:
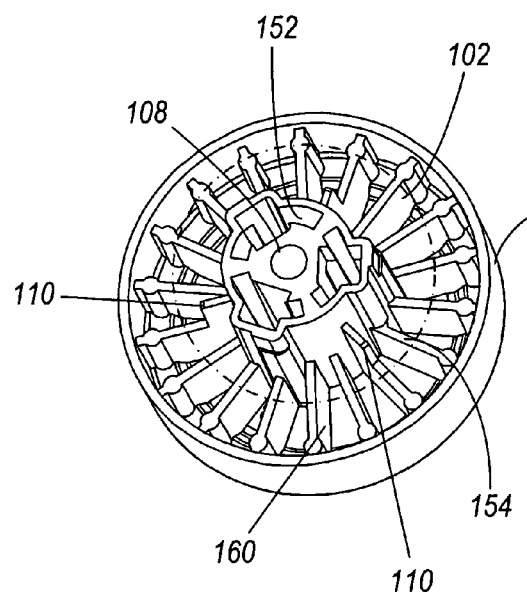
FIG. 6a is a bottom view of a photocontrol receptacle according to one embodiment of the present invention.
Figure 6B:
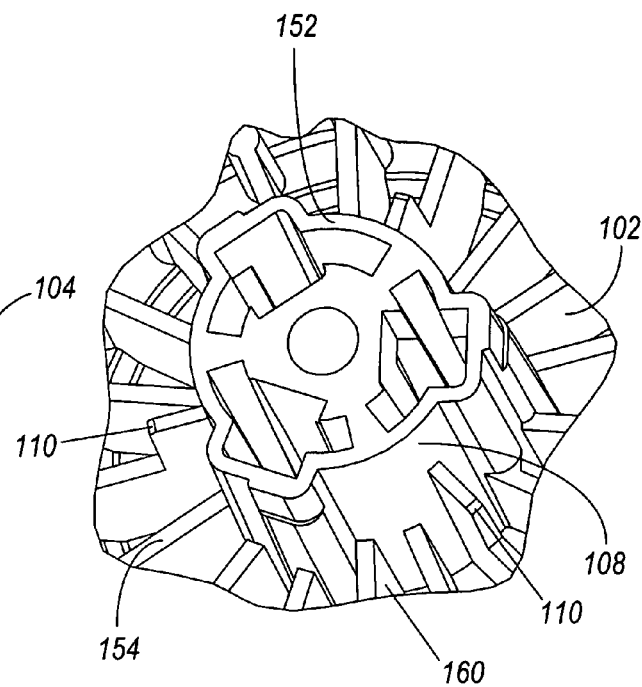
Figure 7A:
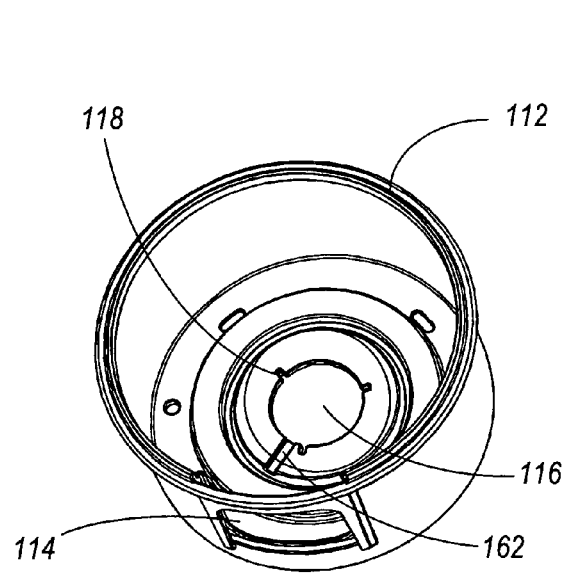
FIG. 7a is a perspective view of a cupola base according to one embodiment of the present invention.
Figure 7B:
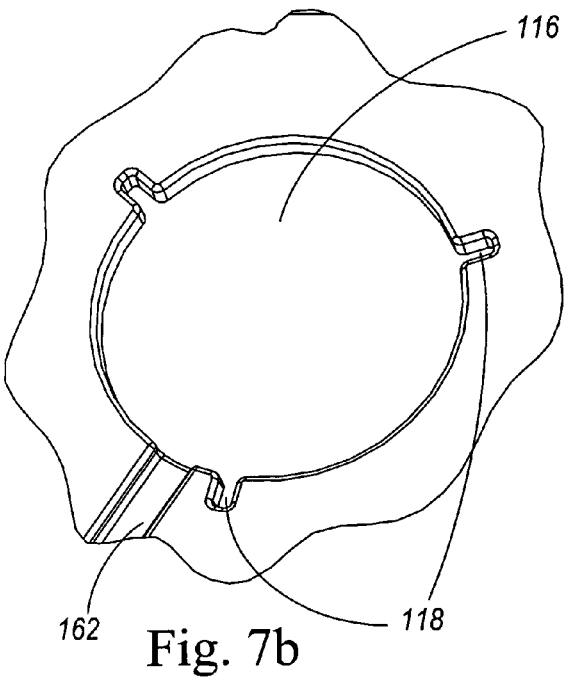
Figure 8A:
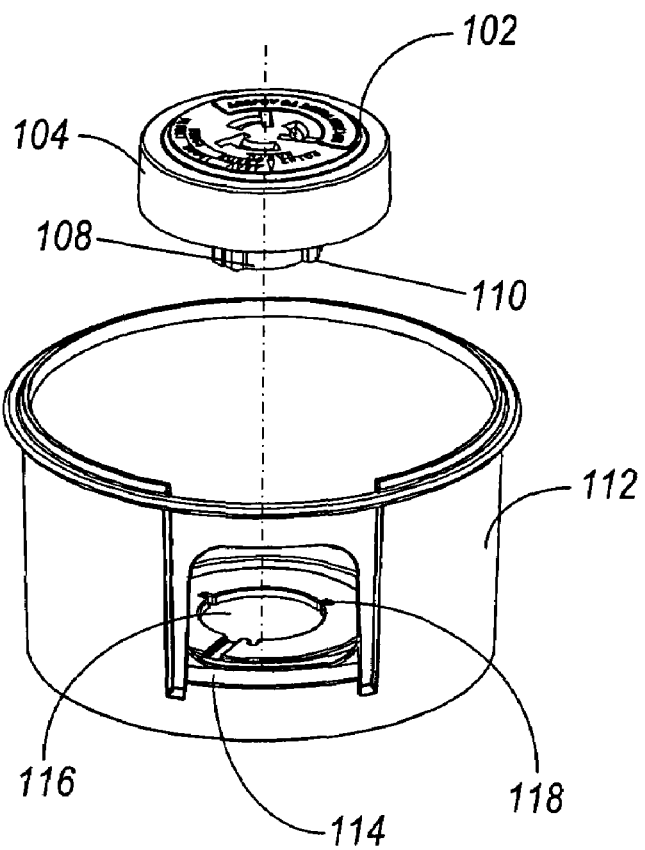
FIG. 8a shows a photocontrol receptacle and a cupola base prior to engagement according to one embodiment of the present invention.
Figure 8B:
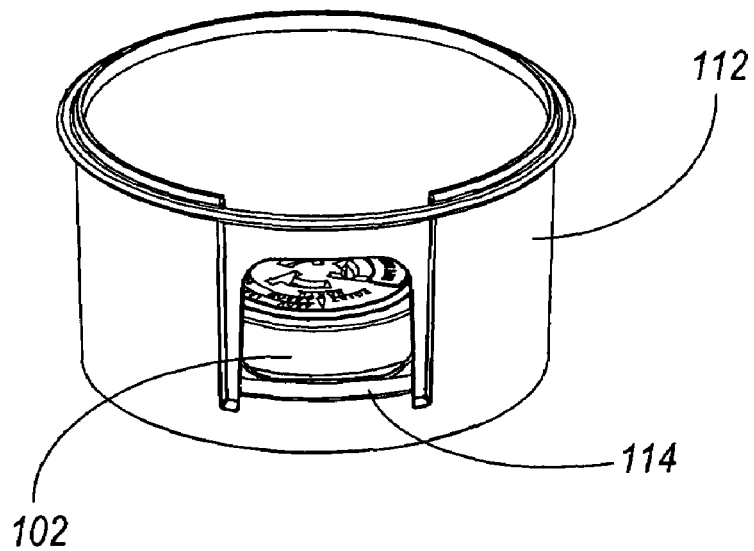

FIGS. 6a and 6b show one embodiment of the bottom of a photocontrol receptacle 102. The photocontrol receptacle 102 includes a base portion 104 and a connection member 108 extending from the base portion 104. The connection member 108 may include a central portion 152 and support flanges 154. The support flanges 154 may extend from the base portion 104 to the central portion 152 for supporting the connection member 108 and decreasing the chance that the connection member 108 becomes disconnected from the base portion 104. The support flanges 154 may include connection flanges 110 that are adapted to engage notches 118 in the cupola base opening 116, as shown in FIGS. 7a and 7b. The notches 118 may be sized to receive the connection flanges 110. As shown in FIGS. 8a and 8b, the photocontrol receptacle 102 may engage the cupola base 112 by aligning the connection flanges 110 with the cupola base notches 118 and inserting the connection member 108 through the cupola base opening 116. After engagement, the photocontrol receptacle 102 is preferably prevented from rotating relative to the cupola base.

In some embodiments, the support flanges 154 include at least one flange 160 having a different size than the other support flanges 154. The cupola base 112 may include at least one notch 162 having a different size than the other notches 118. The different sized notch 162 may be configured to only receive the different sized flange 160, thereby requiring the photocontrol receptacle to be oriented in a particular direction relative to the cupola base 112. For instance, the photocontrol receptacle 102 may be required to engage the cupola base 112 in a direction such that when the photocontrol is connected to the photocontrol receptacle 102, the photocontrol sensor is aligned with a cupola base window 114.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope.

What is claimed is:

1. An apparatus comprising:
   a photocontrol receptacle comprising a base portion and a connection member;
   a fixture housing comprising an opening for receiving the connection member and at least one rib;
   a cupola base comprising an opening for receiving the connection member and at least one feature for detachably engaging the at least one rib;
   a spring coupled to the connection member, the spring configured such that the photocontrol receptacle moves in a first direction upon application of a force in the first direction and recoils when the force is removed or decreased; and
   wherein the at least one feature is configured to disengage with the at least one rib when the photocontrol receptacle is moved in the first direction.

2. The apparatus of claim 1, wherein the cupola base is configured to engage the connection member to restrict rotational movement by the photocontrol receptacle relative to the cupola base.

3. The apparatus of claim 1, wherein the connection member comprises at least one flange and the cupola base opening comprises at least one notch adapted to receive the at least one flange.

4. The apparatus of claim 3, wherein the connection member comprises a locator flange and a primary flange and the cupola base opening comprises a locator notch and a primary notch; and
   wherein the locator notch is adapted to receive the locator flange and the primary notch is adapted to receive the primary flange for positioning the photocontrol receptacle in a pre-set orientation relative to the cupola base.

5. The apparatus of claim 1, wherein the cupola base further comprises a window that allows light to enter the cupola base.

6. The apparatus of claim 1, wherein a base portion of the photocontrol receptacle has a diameter larger than the cupola base opening.

7. The apparatus of claim 1, wherein the at least one feature comprises a stop feature and the at least one rib comprises a stop rib; and
   wherein the stop rib is adapted to engage the stop feature to limit rotation of the cupola base to less than 360°.

8. A method comprising:
   providing a photocontrol receptacle comprising a base portion and a connection member;
   providing a fixture housing comprising an opening for receiving the connection member and at least one rib;

providing a cupola base comprising an opening for receiving the connection member and at least one feature configured to detachably engage the at least one rib;

providing a spring;

inserting the connection member in the cupola base opening;

inserting the connection member in the fixture housing opening; and coupling the spring to the connection member, wherein (a) the spring is configured such that the photocontrol receptacle moves in a first direction upon application of a force in the first direction and recoils when the force is removed or decreased; and (b) the cupola base features are adapted to disengage with the at least one rib when the photocontrol receptacle is moved in the first direction.

9. The method of claim 8, wherein inserting the connection member in the cupola base opening comprises restricting rotational movement by the photocontrol receptacle relative to the cupola base.

10. The method of claim 8, wherein inserting the connection member in the cupola base opening comprises inserting a connection member flange into a cupola base opening notch.

11. The method of claim 8, wherein inserting the connection member in the cupola base opening comprises:

inserting a primary connection member flange into a primary cupola base notch; and inserting a locator connection member flange into a locator cupola base notch.

12. The method of claim 8, further comprising providing a window on a side of the cupola base for allowing light to enter the cupola base.

13. The method of claim 8, further comprising providing a photocontrol receptacle with the base portion having a diameter larger than the cupola base opening.

14. The method of claim 8, further comprising:

engaging the cupola base with the fixture housing a fixture housing stop rib to engage a cupola base stop feature to limit the rotation of the cupola base to less than 360°.

15. An apparatus comprising:

a photocontrol receptacle comprising a base portion and a connection member extending from the base portion, the connection member comprising a primary flange and a locator flange, the primary flange having a different size than the locator flange;

a cupola base comprising a window for allowing light to enter the cupola base and an opening, the opening comprising a primary notch and a locator notch having a different size than the primary notch, the primary notch being configured to receive the primary flange and the locator notch being configured to receive the locator flange; and wherein the primary notch and locator notch are positioned to orient the photocontrol receptacle to a pre-set location relative to the cupola base window.

16. The apparatus of claim 15, further comprising:

a fixture housing comprising an opening for receiving the connection member and at least one rib, wherein the cupola base comprises at least one feature adapted to detachably engage the at least one rib;

a spring coupled to the connection member and configured such that the photocontrol receptacle moves in a first direction upon application of a force in the first direction and recoils when the force is removed or decreased; and wherein the at least one feature is adapted to disengage with the at least one rib when the photocontrol receptacle is moved in the first direction and restrict rotational movement by the photocontrol receptacle relative to the cupola base.

17. The apparatus of claim 15, wherein the base portion has a diameter larger than the cupola base opening.

18. An apparatus comprising:

a fixture housing comprising at least one stop rib;

a cupola base comprising at least one stop feature adapted to detachably engage the at least one stop rib; and wherein the stop feature is adapted to engage the stop rib to limit rotation of the cupola base to less than 360°.

19. The apparatus of claim 18, further comprising:

a photocontrol receptacle comprising a base portion and a connection member; and wherein the fixture housing further comprises an opening for receiving the connection member and the cupola base further comprises an opening for receiving the connection member.

20. The apparatus of claim 19, further comprising:

a spring coupled to the connection member, the spring configured to allow the photocontrol receptacle to move in a first direction upon application of a force in the first direction and recoil when the force is removed or decreased.

21. The apparatus of claim 19, wherein the connection member comprises a primary flange and a locator flange, the primary flange having a different size than the locator flange;

wherein the cupola base opening comprises a primary notch and a locator notch having a different size than the primary notch, the primary notch being adapted to receive the primary flange and the locator notch being adapted to receive the locator flange; and wherein the primary notch and locator notch are positioned to orient the photocontrol receptacle to a pre-set location relative to the cupola base window.

22. The apparatus of claim 19, wherein the base portion has a diameter larger than the cupola base opening.

* * * * *